US012757031B2

(12) United States Patent
Vuppala et al.

(10) Patent No.: US 12,757,031 B2
(45) Date of Patent: Oct. 6, 2026

(54) METHOD AND SYSTEM FOR DSS BETWEEN LTE CELL AND NR CELL IN WIRELESS NETWORK

(71) Applicant: Samsung Electronics Co., Ltd., Suwon-si (KR)

(72) Inventors: Ramesh Chandra Vuppala, Bangalore (IN); Alok Narayan Singh, Bangalore (IN); Amarpreet Singh Sethi, Bangalore (IN); Anshuman Nigam, Bangalore (IN); Santhosh Rao Keerthi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 18/319,851

(22) Filed: May 18, 2023

(65) Prior Publication Data

US 2023/0379723 A1 Nov. 23, 2023

(30) Foreign Application Priority Data

May 20, 2022 (IN) ............................ 202241029255
Apr. 19, 2023 (IN) ............................ 2022 41029255

(51) Int. Cl.

*H04W 16/14* (2009.01)
*H04W 24/10* (2009.01)
*H04W 28/02* (2009.01)

(52) U.S. Cl.

CPC ........... *H04W 16/14* (2013.01); *H04W 24/10* (2013.01); *H04W 28/0268* (2013.01)

(58) Field of Classification Search

CPC .. H04W 16/14; H04W 24/10; H04W 28/0268

(Continued)

(56) References Cited

U.S. PATENT DOCUMENTS

2018/0192334 A1* 7/2018 Wu .................. H04W 36/0033
2020/0059333 A1* 2/2020 Paladugu ............. H04W 76/16

(Continued)

FOREIGN PATENT DOCUMENTS

EP 3422799 A1 * 1/2019 ............ H04W 76/15
WO 2021/155124 A1 8/2021

OTHER PUBLICATIONS

Indian Office Action Aug. 11, 2026, issued in Korean Patent Application No. 202241029255.

*Primary Examiner* — Nicholas A Jensen
*Assistant Examiner* — Oladiran Gideon Olaleye
(74) *Attorney, Agent, or Firm* — Jefferson IP Law, LLP

(57) ABSTRACT

The disclosure relates to a 5$^{th}$ generation (5G) or 6$^{th}$ generation (6G) communication system for supporting a higher data transmission rate. A method and a network entity for dynamic spectrum sharing (DSS) between long term evolution (LTE) cell and new radio (NR) cell in a wireless network are provided. The method includes determining a plurality of DSS parameter, determining a resource split between at least one bearer of a plurality of bearers of the LTE cell and at least one bearer of a plurality of bearers of the NR cell based on the plurality of DSS parameters, determining optimal key performance indicator (KPI) parameters for an overlapped LTE cell and NR cell combination based the resource split, and applying optimal tuning parameters on the overlapped LTE cell and NR cell combination in the wireless network based on the optimal KPI parameters.

16 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0221506 | A1* | 7/2020 | Jeon .................. | H04W 74/0833 |
| 2021/0377804 | A1* | 12/2021 | Sivaraj .................. | H04W 76/15 |
| 2022/0150713 | A1 | 5/2022 | Zhou et al. | |
| 2023/0389004 | A1* | 11/2023 | Chaudhuri ........... | H04B 7/0452 |

* cited by examiner

Example Slot Pattern configuration

METHOD AND SYSTEM FOR DSS BETWEEN LTE CELL AND NR CELL IN WIRELESS NETWORK

CROSS-REFERENCE TO RELATED APPLICATION(S)

This application is based on and claims priority under 35 U.S.C. § 119(a) of an Indian provisional patent application number 202241029255, filed on May 20, 2022, in the Indian Patent Office, and of an Indian non-provisional patent application number 202241029255, filed on Apr. 19, 2023, in the Indian Intellectual Property Office, the disclosure of each of which is incorporated by reference herein in its entirety.

BACKGROUND

1. Field

The disclosure relates to a method and a system for dynamic spectrum sharing (DSS) between a long-term evolution (LTE) cell and a new radio (NR) cell in a wireless network.

2. Description of Related Art

5$^{th}$ generation (5G) mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

In general, a NR system needs to use low-frequency spectrum in order to provide a wide area coverage. The low-frequency spectrum is scarcely available as the low-frequency spectrum is mostly occupied by a long term evolution (LTE) system. In such scenario, efficient spectrum sharing is a good alternative to spectrum re-farming from the LTE system to the NR system, which helps in a smooth migration over a period of time from the LTE system to the NR system as a usage and a popularity for the NR starts to increase. LTE/NR spectrum sharing enables sharing of resources in a same carrier with dynamic adaptation based on load, users, or the like, thereby achieving high spectrum utilization efficiency, which is not currently available in methods and systems of the related art.

Spectrum sharing system of the related art dynamically configures a number of subframes to support communications via an LTE air interface and a 5$^{th}$ generation (5G) NR-LTE interface. However, the spectrum sharing system of the related art does not dynamically control DSS tuning parameters and does not perform optimal split between control and data symbols for slot pattern to achieve high spectrum utilization efficiency.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for DSS between a LTE cell and a NR cell in a wireless network. The method includes determining, by a network entity, a resource split between at least one bearer of a plurality of bearers of the LTE cell and at least one bearer of a plurality of bearers of the NR cell based on a plurality of DSS parameters.

Another aspect of the disclosure is to determine optimal key performance indicator (KPI) parameters for an overlapped LTE cell and NR cell combination based the resource split.

Another aspect of the disclosure is to apply optimal tuning parameters on the overlapped LTE cell and NR cell combination in the wireless network based on the optimal KPI parameters.

Another aspect of the disclosure is to provide a method that discloses an LTE/NR spectrum sharing which enables sharing of resources in a same carrier with dynamic adaptation based on load, users, or the like, thereby achieving high spectrum utilization efficiency.

Additional aspects will be set forth in part in the description which follows and, in part, will be apparent from the description, or may be learned by practice of the presented embodiments.

In accordance with an aspect of the disclosure, a method for DSS between an LTE cell and a NR cell in a wireless network is provided. The method includes determining, by a network entity, a plurality of DSS parameters. The method includes determining a resource split between at least one bearer of a plurality of bearers of the LTE cell and at least one bearer of a plurality of bearers of the NR cell based on the plurality of DSS parameters. The method also includes determining optimal KPI parameters for an overlapped LTE cell and NR cell combination based the resource split. The method includes applying optimal tuning parameters on the overlapped LTE cell and NR cell combination in the wireless network based on the optimal KPI parameters.

In an embodiment of the disclosure, the plurality of DSS parameters includes a cell identifier (ID), a radio network temporary identifier (RNTI), a bandwidth, total number of resource blocks, a user equipment (UE) configuration, access and mobility management related parameters of the UE, a UE ID, channel model parameters, buffer occupancy (BO), modulation and coding scheme (MCS), a packet delay budget (PDB), a signal-to-noise ratio and a block error rate.

In an embodiment of the disclosure, determining, by the network entity, the optimal KPI parameters for the overlapped LTE cell and NR cell combination includes determining fairness index for maintaining fairness among the plurality of bearers of the LTE cell and the plurality of bearers of the NR cell based on the resource split, determining throughput in a system and across the neighboring cells of the LTE cell and the neighboring cells of the NR cell based on the fairness index, determining interference across neighboring cells of the LTE cell and neighboring cells of the NR cell based on the plurality of DSS parameters, and determining the optimal KPI parameters for the overlapped LTE cell and NR cell combination based on the fairness index, the interference and the throughput in the system and across the neighboring cells of the LTE cell and the neighboring cells of the NR cell.

In an embodiment of the disclosure, determining, by the network entity, the fairness index for maintaining fairness among the plurality of bearers of the LTE cell and the plurality of bearers of the NR cell includes determining priority metrics including an accumulated transport block size and a guaranteed bit rate (GBR) of each bearer of the plurality of bearers of the LTE cell, and priority metrics including an accumulated transport block size and an GBR of each bearer of the plurality of bearers of the NR cell based on the plurality of DSS parameters, and determining the fairness index for maintaining fairness among the plurality of bearers of the LTE cell and the plurality of bearers of the NR cell using the priority metrics including the accumulated transport block size and the GBR of each bearer of the plurality of bearers of the LTE cell and the priority metrics including the accumulated transport block size and the GBR of each bearer of the plurality of bearers of the NR cell.

In an embodiment of the disclosure, applying, by the network entity, the optimal tuning parameters on the overlapped LTE cell and NR cell combination in the wireless network includes determining optimal resource split between the at least one bearer of the plurality of bearers of the LTE cell and the at least one bearer of the plurality of bearers of the NR cell is based on a frequency-division multiplexing (FDM) mode, determining a slot for allocating at least one optimal resource to the at least one bearer of the plurality of bearers of the LTE cell and at least one optimal resource to the at least one bearer of the plurality of bearers of the NR cell is based on the FDM mode or a time-division multiplexing (TDM) mode, and allocating at least one optimal resource to the at least one bearer of the plurality of bearers of the LTE cell and at least one optimal resource to the at least one bearer of the plurality of bearers of the NR cell in response to determining the slot.

In an embodiment of the disclosure, when the slot for allocating the at least one optimal resource to the at least one bearer of the plurality of bearers of the LTE cell and the at least one optimal resource to the at least one bearer of the plurality of bearers of the NR cell is based on the FDM, the method includes selecting candidate bearers from the plurality of bearers of the LTE cell and the plurality of bearers of the NR cell based on the priority metrics including the accumulated transport block size and the GBR of each bearer of the plurality of bearers of the LTE cell and the priority metrics including the accumulated transport block size and the GBR of each bearer of the plurality of bearers of the NR cell, separating the candidate bearers per cell of the LTE cell and the NR cell based on the priority metrics including the accumulated transport block size and the GBR of each bearer of the plurality of bearers of the LTE cell and the priority metrics including the accumulated transport block size and the GBR of each bearer of the plurality of bearers of the NR cell, and allocating the at least one optimal resource to the at least one bearer of the plurality of bearers of the LTE cell and the at least one optimal resource to the at least one bearer of the plurality of bearers of the NR cell using the slot based on the FDM.

In an embodiment of the disclosure, when the slot for allocating the at least one optimal resource to the at least one bearer of the plurality of bearers of the LTE cell and the at least one optimal resource to the at least one bearer of the plurality of bearers of the NR cell is based on the TDM, the method includes determining the candidate bearers per cell of the LTE cell and the NR cell based on the priority metrics including the accumulated transport block size and the GBR of each bearer of the plurality of bearers of the LTE cell and the priority metrics including the accumulated transport block size and the GBR of each bearer of the plurality of bearers of the NR cell, and allocating the at least one optimal resource to the at least one bearer of the plurality of bearers of the LTE cell and the at least one optimal resource to the at least one bearer of the plurality of bearers of the NR cell using the slot based on the TDM.

In accordance with another aspect of the disclosure, a network entity for DSS between the LTE cell and the NR cell in the wireless network is provided. The network entity includes a memory, a processor coupled to the memory, a communicator coupled to the memory and the processor, and a centralized controller coupled to the memory, the processor and the communicator. The centralized controller configured to determine the plurality of DSS parameters, determine the resource split between the at least one bearer of the plurality of bearers of the LTE cell and the at least one bearer of the plurality of bearers of the NR cell based on the plurality of DSS parameters, determine the optimal KPI parameters for the overlapped LTE cell and NR cell combination based the resource split, and apply the optimal tuning parameters on the overlapped LTE cell and NR cell combination in the wireless network based on the optimal KPI parameters.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
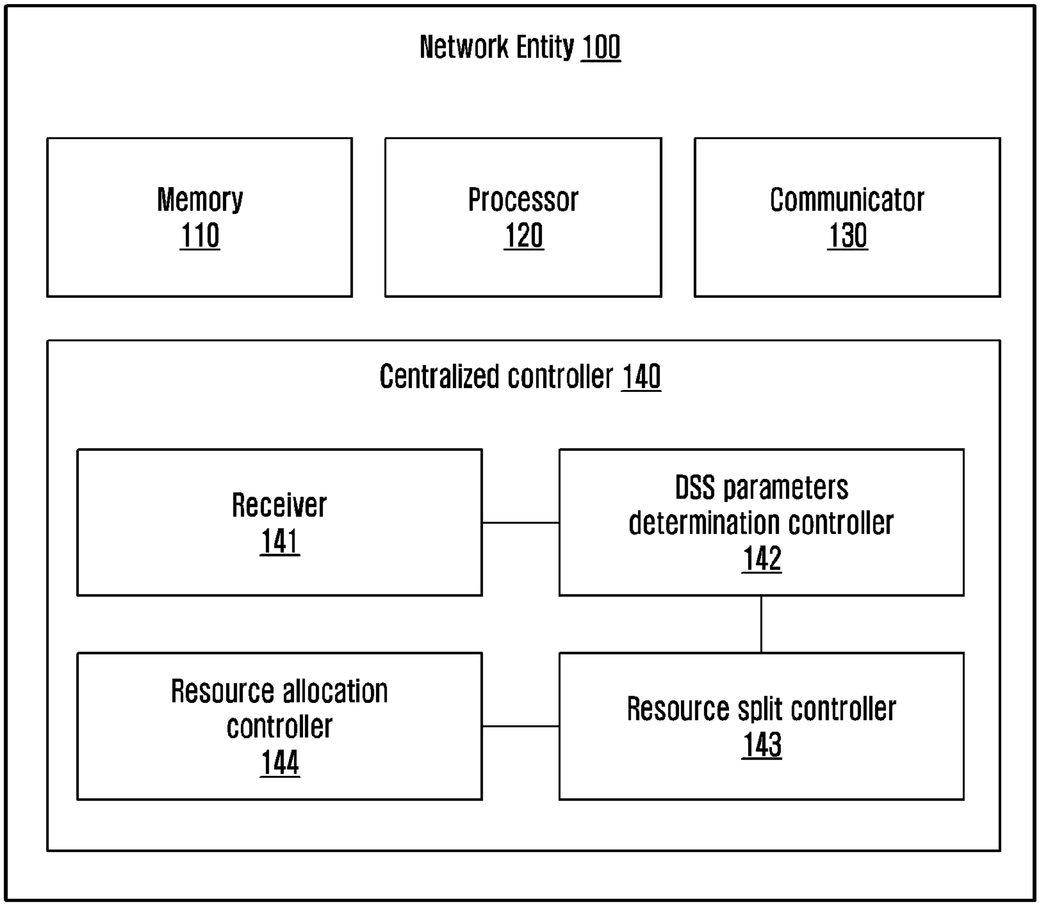
FIG. 1 is a block diagram of a network entity for dynamic spectrum sharing (DSS) between a long term evolution (LTE) cell and a new radio (NR) cell in a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, the embodiments herein disclose a method for a method for DSS between a LTE cell and a NR cell in a wireless network. The method includes determining, by a network entity, a plurality of DSS parameters. The method includes determining a resource split between at least one bearer of a plurality of bearers of the LTE cell and at least one bearer of a plurality of bearers of the NR cell based on the plurality of DSS parameters. The method also includes determining optimal KPI parameters for an overlapped LTE cell and NR cell combination based the resource split. The method includes applying optimal tuning parameters on the overlapped LTE cell and NR cell combination in the wireless network based on the optimal KPI parameters.

Accordingly, the embodiments herein disclose a system for DSS between the LTE cell and the NR cell in the wireless network. The method includes a memory, a processor coupled to the memory, a communicator coupled to the memory and the processor, and the network entity coupled to the memory, the processor and the communicator. The network entity configured to determine the plurality of DSS parameters, determine the resource split between the at least one bearer of the plurality of bearers of the LTE cell and the at least one bearer of the plurality of bearers of the NR cell based on the plurality of DSS parameters, determine the optimal KPI parameters for the overlapped LTE cell and NR cell combination based the resource split, and apply the optimal tuning parameters on the overlapped LTE cell and NR cell combination in the wireless network based on the optimal KPI parameters.

Spectrum sharing system of the related art dynamically configures a number of subframes to support communications via an LTE air interface and a 5G NR-LTE interface. However, the spectrum sharing system of the related art does not dynamically control DSS tuning parameters and does not perform optimal split between control and data symbols for slot pattern to achieve high spectrum utilization efficiency.

Figure 3:
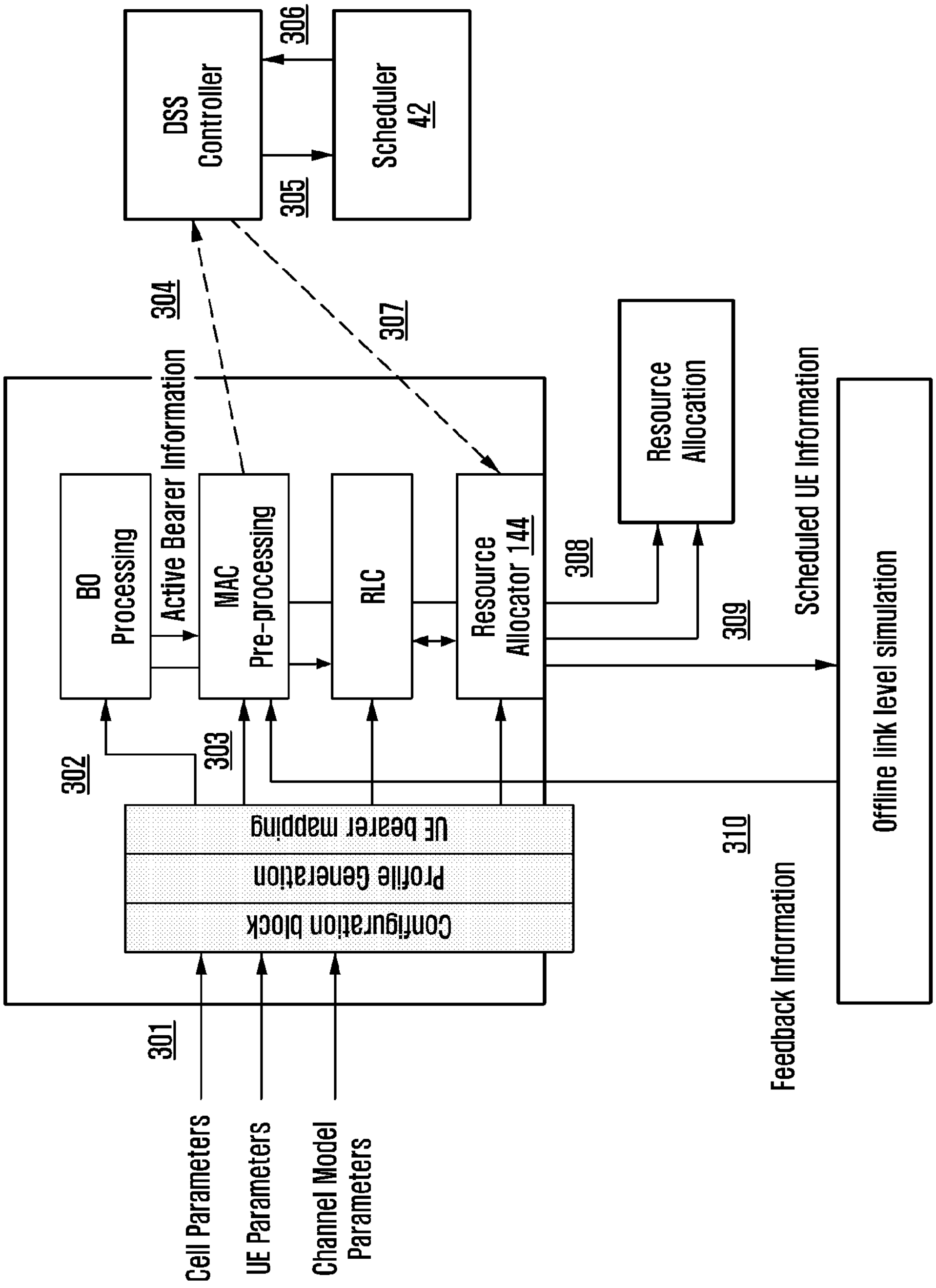
FIG. 3 (RELATED ART)
FIG. 3 illustrates a step-by step procedure for allocating resources according to the related art.

FIG. 3 illustrates a step-by step procedure for allocating resources according to the related art.

Referring to FIG. 3, methods and systems of the related art allocate resources using a rule-based mechanism. The methods and systems of the related art allocate the resources by following operations:

At operation 301, the network entity determines cell parameters, UE parameters and a channel model parameters.

At operation 302, BO is determined from one of the cell parameters, UE parameters and a channel model parameters for the at least one bearer of the plurality of bearers of the LTE cell and the at least one bearer of the plurality of bearers of the NR cell.

At operation 303, a media access control (MAC) layer pre-processes the cell parameters, the UE parameters and the channel model parameters and output a list of bearers per cell to a central controller.

At operation 304, the central controller receives the list of bearers per cell and determines whether a slot for allocating an optimal resource to the bearer of the LTE cell and an optimal resource to the bearer of the NR cell is based on a FDM mode or a TDM mode. Further at operation 304, the central controller directly shares candidate bearers to a resource allocation controller based on the pre-processed parameters.

At operation 305, the central controller shares the list of bearer of each cell to a scheduler if the slot for allocating the optimal resource to the bearer of the LTE cell and the optimal resource to the bearer of the NR cell is based on the FDM mode.

At operation 306, the scheduler determines priority metrics and a GBR of each bearer of the LTE cell and the NR cell and chooses candidate bearers (or configured values) based on the priority metrics and the GBR of each bearer of the LTE cell and the NR cell. The scheduler shares the candidate bearers (or configured values) to the central controller in priority order of the GBR.

At operation 307, the central controller performs resource split between the LTE bearers and NR bearers based on simplistic parameters for example ratio of number of bearers and shares resources to a resource allocation controller.

At operation 308, the resource allocation controller allocates the resources accordingly based on the ratio of number of bearers.

At operations 309 and 310, the resource allocation controller shares scheduled UE information and/or resources allocation information to a physical layer. The physical layer gets feedback values of the priority metrics, such as a bit/block error rate for a given signal to interference and noise ratio (SINR) and shares with the MAC layer.

From the above operations, the methods and systems of the related art clearly states that the resources are allocated using the rule based mechanisms in which spectrum re-farming from a LTE system to a NR system is not efficient and spectrum utilization efficiency is decreased. Hence, there is a need for a centralized controller orchestrating the NR system and the LTE system when both the NR system and the LTE system are deployed in an overlapping coverage area sharing the same spectrum resources.

Unlike the methods and systems of the related art, the proposed method uses a reinforcement learning model based approach to dynamically control DSS tuning parameters. The DSS tuning parameters are dynamically controlled by optimally splitting the resources between control and data symbols based on slot patterns, and dynamically allocating resources across the LTE cells and the NR cells based on the slot patterns. Moreover, the proposed method includes the centralized controller orchestrating the NR system and the LTE system when both the NR system and the LTE system are deployed in the overlapping coverage area sharing the same spectrum resources.

Referring now to the drawings and more particularly to FIGS. 1 to 4, and 5A to 5C, where similar reference characters denote corresponding features consistently throughout the figure, these are shown preferred embodiments.

FIG. 1 is a block diagram of a network entity for DSS between a LTE cell and a NR cell in a wireless network according to an embodiment of the disclosure.

Referring to FIG. 1, the network entity 100 includes a centralized controller 140, such as for example but not limited to a centralized virtual RAN (CvRAN) controller, a RAN controller which is virtual or non-virtual, a single centralized controller and a software-defined networking controller.

In an embodiment of the disclosure, the network entity 100 includes a memory 110, a processor 120, a communicator 130, and the centralized controller 140.

The memory 110 is configured to store the plurality of DSS parameters including a cell ID, a RNTI, a bandwidth, total number of resource blocks, a UE configuration, an access and mobility management related parameters of the UE, a UE ID, channel model parameters, BO, MCS, a PDB, a signal-to-noise ratio and a block error rate. The memory 110 includes non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In addition, the memory 110, in some examples, is considered a non-transitory storage medium. The term "non-transitory" indicates that the storage medium is not embodied in a carrier wave or a propagated signal. However, the term "non-transitory" is not interpreted that the memory 110 is non-movable. In some examples, the memory 110 is configured to store larger amounts of information. In certain examples, a non-transitory storage medium stores data that changes over time (e.g., in a random access memory (RAM) or cache).

The processor 120 includes one or a plurality of processors. The one or the plurality of processors is a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The processor 120 includes multiple cores and is configured to determine the plurality of DSS parameters stored in the memory 110.

In an embodiment of the disclosure, the communicator 130 includes an electronic circuit specific to a standard that enables wired or wireless communication. The communicator 130 is configured to communicate internally between internal hardware components of the network entity 100 and with external devices via one or more networks.

In an embodiment of the disclosure, the centralized controller 140 includes a receiver 141, a DSS parameters determination controller 42, a resource split controller 143 and a resource allocation controller 144.

In an embodiment of the disclosure, the receiver 141 is configured to receive a plurality of UE parameters from a UE, a plurality of cell parameters from the LTE cell and the NR cell, and the channel model parameters. The plurality of UE parameters include but not limited to the UE configuration, the access and mobility management related parameters of the UE and the UE ID. The plurality of cell parameters include but not limited to the cell ID, the RNTI, the bandwidth and the total number of resource blocks. The channel model parameters include but not limited to a coherence bandwidth, a ratio of power in a dominant path and a scattered path, and a set of key/value pairs.

In an embodiment of the disclosure, the DSS parameters determination controller 142 is configured to determine the plurality of DSS parameters from the plurality of UE parameters, the plurality of cell parameters, the channel model parameters and a plurality of network parameters. The plurality of network parameters include but not limited to a bandwidth, a throughput, latency, a packet loss, BO, MCS, a PDB, a signal-to-noise ratio, a block error rate and jitter. The plurality of DSS parameters includes but not limited to the cell ID, the RNTI, the bandwidth, the total number of resource blocks, the UE configuration, the access and mobility management related parameters of the UE, the UE ID, the channel model parameters, the BO, the MCS, the PDB, the signal-to-noise ratio and the block error rate.

In an embodiment of the disclosure, the resource split controller 143 is configured to determine a resource split between at least one bearer of a plurality of bearers of the LTE cell and at least one bearer of a plurality of bearers of the NR cell based on the plurality of DSS parameters. Further, the resource split controller 143 is configured to determine optimal KPI parameters for an overlapped LTE cell and NR cell combination based the resource split.

In an embodiment of the disclosure, the optimal KPI parameters for the overlapped LTE cell and NR cell combination are determined by:

determining fairness index for maintaining fairness among the plurality of bearers of the LTE cell and the plurality of bearers of the NR cell based on the resource split, determining throughput in the network entity 100 and across neighboring cells of the LTE cell and neighboring cells of the NR cell based on the fairness index, and determining interference across the neighboring cells of the LTE cell and the neighboring cells of the NR cell based on the plurality of DSS parameters.

In an embodiment of the disclosure, the fairness index is determined by determining priority metrics including an accumulated transport block size and a guaranteed bit rate (GBR) of each bearer of the plurality of bearers of the LTE cell, and priority metrics including an accumulated transport block size and an GBR of each bearer of the plurality of bearers of the NR cell based on the plurality of DSS parameters.

In an embodiment of the disclosure, the resource allocation controller 144 is configured to apply optimal tuning parameters on the overlapped LTE cell and NR cell combination in the wireless network based on the optimal KPI parameters. Further, the resource allocation controller 144 is configured to allocate at least one optimal resource to the at least one bearer of the plurality of bearers of the LTE cell and at least one optimal resource to the at least one bearer of the plurality of bearers of the NR cell to apply the optimal tuning parameters on the overlapped LTE cell and NR cell combination in the wireless network.

The centralized controller 140 is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits, for example, are embodied in one or more semiconductor chips, or on substrate supports, such as printed circuit boards, and the like.

At least one of the plurality of modules/components of the centralized controller 140 is implemented through an AI model. A function associated with the AI model is performed through the memory 110 and the processor 120. The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning is performed in a device itself in which AI according to an embodiment is performed, and/or is implemented through a separate server/system.

The AI model consists of a plurality of neural network layers. Each layer has a plurality of weight values and performs a layer operation through calculation of a previous layer and an operation of a plurality of weights. Examples of neural networks include but are not limited to convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include but are not limited to supervised learning, unsupervised learning, semi-supervised learning, or reinforcement learning.

Although the FIG. 1 show the hardware elements of the network entity 100 but it is to be understood that other embodiments are not limited thereon. In other embodiments of the disclosure, the network entity 100 includes less or more number of elements. Further, the labels or names of the elements are used only for illustrative purpose and does not limit the scope of the disclosure. One or more components are combined together to perform same or substantially similar function.

Figure 2:
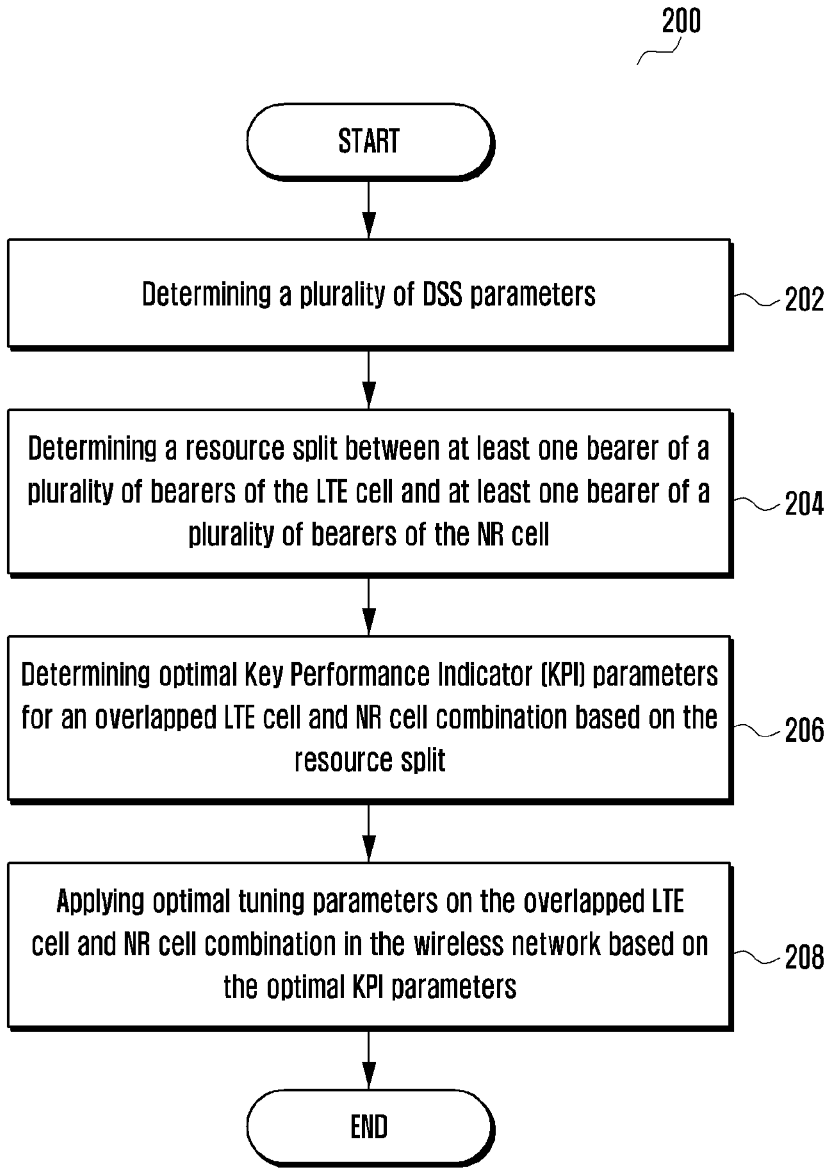
FIG. 2 is a flowchart illustrating a method for DSS between an LTE cell and an NR cell in a wireless network according to an embodiment of the disclosure.

FIG. 2 is a flowchart 200 illustrating a method for DSS between an LTE cell and an NR cell in a wireless network by a network entity according to an embodiment of the disclosure.

Referring to FIG. 2, at operation 202, the method includes the network entity 100 determining the plurality of DSS parameters. For example, in the network entity 100 as illustrated in the FIG. 1, the centralized controller 140 is configured to determine the plurality of DSS parameters.

At operation 204, the method includes the network entity 100 determining the resource split between the at least one bearer of the plurality of bearers of the LTE cell and the at least one bearer of the plurality of bearers of the NR cell based on the plurality of DSS parameters. For example, in the network entity 100 as illustrated in the FIG. 1, the centralized controller 140 is configured to determine the resource split between the at least one bearer of the plurality of bearers of the LTE cell and the at least one bearer of the plurality of bearers of the NR cell based on the plurality of DSS parameters.

At operation 206, the method includes the network entity 100 determining the optimal KPI parameters for the overlapped LTE cell and NR cell combination based the resource split. For example, in the network entity 100 as illustrated in the FIG. 1, the centralized controller 140 is configured to determine the optimal KPI parameters for the overlapped LTE cell and NR cell combination based the resource split.

At operation 208, the method includes the network entity 100 applying the optimal tuning parameters on the overlapped LTE cell and NR cell combination in the wireless network based on the optimal KPI parameters. For example, in the network entity 100 as illustrated in the FIG. 1, the centralized controller 140 is configured to apply the optimal tuning parameters on the overlapped LTE cell and NR cell combination in the wireless network based on the optimal KPI parameters.

The various actions, acts, blocks, steps, or the like in the method may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 4:
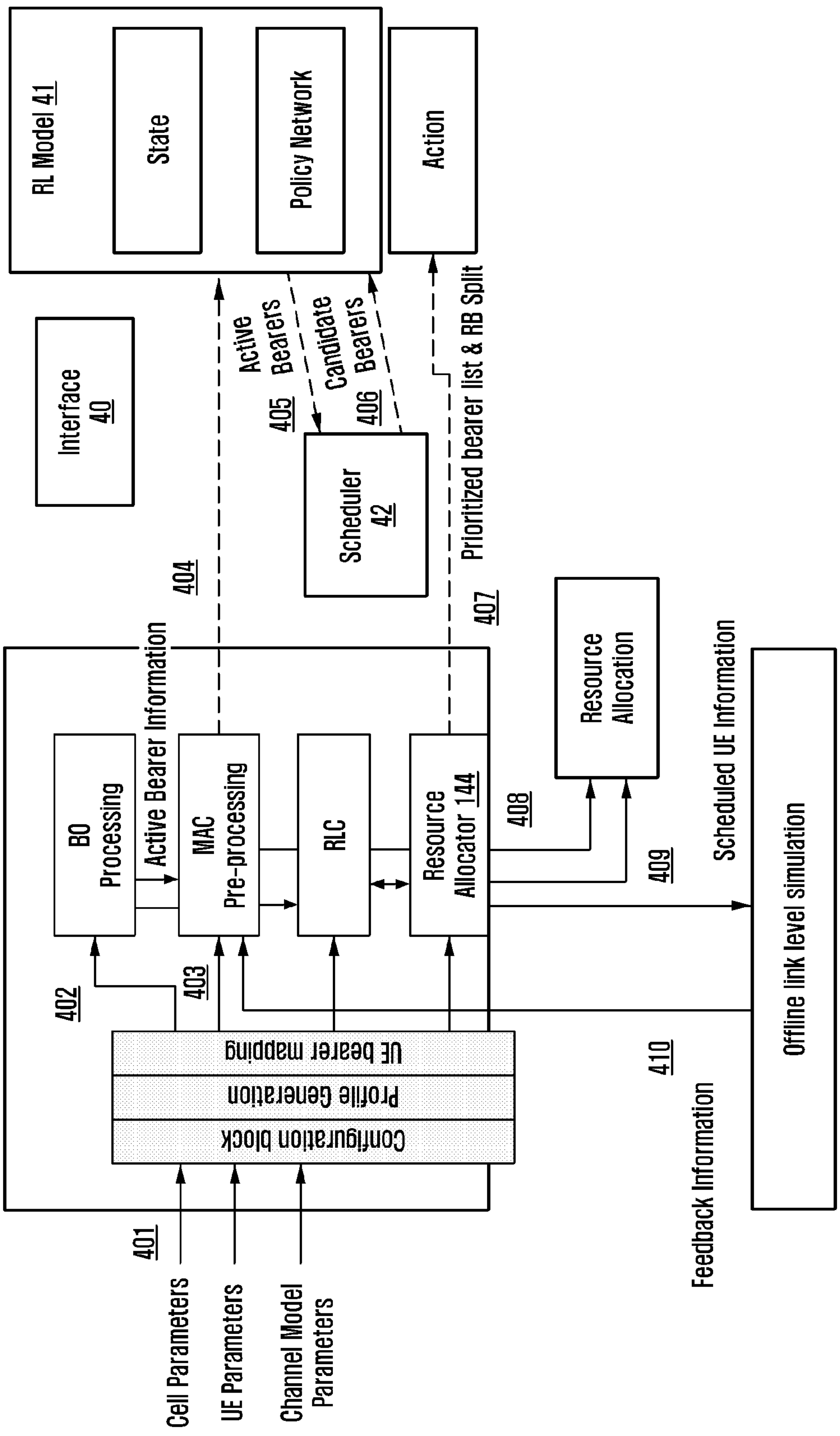
FIG. 4 illustrates a step-by step procedure for DSS between an LTE cell and an NR cell in a wireless network according to an embodiment of the disclosure.

FIG. 4 illustrates a step-by step procedure for DSS between an LTE cell and an NR cell in a wireless network according to an embodiment of the disclosure.

Referring to FIG. 4, at operation 401, the network entity receives the cell parameters from the LTE cell and the NR cell, the UE parameters from the UE and the channel model parameters.

At operation 402, the BO configured in the network entity 100 is determined based on one of the cell parameters, UE parameters, the channel model parameters for the at least one bearer of the plurality of bearers of the LTE cell and the at least one bearer of the plurality of bearers of the NR cell.

At operation 403, a MAC layer pre-processes the cell parameters, the UE parameters and the channel model parameters and output a list of bearers per cell to a reinforcement learning (RL) model 41.

At operation 404, the RL model 41 receives the list of bearers per cell via an interface 40 and determines whether a slot for allocating at least one optimal resource to the at least one bearer of the LTE cell and at least one optimal resource to the at least one bearer of the NR cell is based on a FDM mode or a TDM mode.

At operation 405, the RL model 41 shares the list of bearers of each cell to a scheduler 42.

At operation 406, when the RL model 41 determines that the slot for allocating the at least one optimal resource to the at least one bearer of the LTE cell and the at least one optimal resource to the at least one bearer of the NR cell is based on the TDM mode, the scheduler 42:

- determines priority metrics including an accumulated transport block size and a GBR of each bearer of the plurality of bearers of the LTE cell and priority metrics including an accumulated transport block size and a GBR of each bearer of the plurality of bearers of the NR cell,
- determines candidate bearers per cell of the LTE cell and the NR cell, and
- shares the candidate bearers per cell of the LTE cell and the NR cell to the RL model 41.

When the RL model 41 determines resource blocks (RB s) of the slot for allocating the at least one optimal resource to the at least one bearer of the LTE cell and the at least one optimal resource to the at least one bearer of the NR cell is based on the FDM mode, the scheduler 42:

- determines the priority metrics including the accumulated transport block size and the GBR of each bearer of the plurality of bearers of the LTE cell and the priority metrics including the accumulated transport block size and the GBR of each bearer of the plurality of bearers of the NR cell,
- selects candidate bearers from the plurality of bearers of the LTE cell and the plurality of bearers of the NR cell,
- separates the candidate bearers per cell of the LTE cell and the NR cell, and
- shares the candidate bearers per cell of the LTE cell and the NR cell to the RL model 41.

At operation 407, the RL model 41 prioritizes the candidate bearers per cell of the LTE cell and the NR cell and shares the candidate bearers per cell of the LTE cell and the NR cell to the resource allocation controller 144 in priority order.

At operation 408, the resource allocation controller 144 determines optimal resource split between the at least one bearer of the plurality of bearers of the LTE cell and the at least one bearer of the plurality of bearers of the NR. The resource allocation controller 144 determines the slot for allocating the at least one optimal resource to the at least one bearer of the plurality of bearers of the LTE cell and the at least one optimal resource to the at least one bearer of the plurality of bearers of the NR cell. In response to determining the slot, the resource allocation controller 144 allocates the at least one optimal resource to the at least one bearer of the plurality of bearers of the LTE cell and the at least one optimal resource to the at least one bearer of the plurality of bearers of the NR cell.

At operations 409 and 410, the resource allocation controller 144 shares scheduled UE information and/or resources allocation information to a physical layer. The physical layer gets feedback values of the priority metrics, such as a bit/block error rate for a given SINR and shares with the MAC layer.

In an embodiment of the disclosure, for each cell of the LTE cell and the NR cell, the following are recorded:

Delay Histogram: For all of the bearers of the LTE cell and the NR cell, a head value of a line packet's delay is taken. The head value is normalized by the PDB of the at least one bearer. Bins are made where width of the bins and number of the bins are based upon a user's choice. A normalized delay value is determined in a corresponding bin to generate the delay histogram.

MCS_BO Histogram: For all of the bearers of the LTE cell and the NR cell, an outstanding BO and MCS are taken. A two-dimensional (2D) histogram is generated where one dimension is for the BO and other dimension is for the MCS. Bins are made for the BO where the width of the bins and the number of the bins are based upon the user's choice. For the MCS, each bin has a width of 1 and so the number of the bins is equal to a maximum MCS supported in a system+1. Based upon BO value and MCS value, the corresponding bin to which the values correspond to in the 2D histogram is determined.

Action Space for RL model 41: The action space for the RL model 41 involves decision making by the RL model 41 where the RL model 41 decides about how many resource blocks groups (RBGs) has to be made available to one of the LTE cell and the NR cell, say for example the NR cell. Then, the number of RBGs to be made available to the other cell, say for example the LTE cell, is maxRBGs. The maxRBGs are the total RBGs available in the system per slot based upon the bandwidth.

Action is taken by the RL model 41 at every slot. An output layer have a dimension of size (maxRBGs+1), i.e., the action of the RL model 41 takes a value anywhere between 0 to maxRBGs.

Reward for the RL model 41: The reward for the RL model 41 is defined as follows:

$$\text{Reward}=T\#(X^*T+Y^*F)/100$$

where, T=(summation of TB size that gets allocated to each of the bearers among both of the cells only in the current slot)/(111*Num_RB). Here 111 is the maximum TB size per RB and Num_RB is the number of RBs in the system. This normalization is done so that the effective value of T belongs to [0, 1].

X and Y are proportion ratios between the throughput and the fairness for the reward of the RL model.

F is the fairness of the system, which is calculated by fairness Index. The fairness is determined on the accumulated Tb size for each bearer from the beginning of the simulation until the current slot. The value of fairness also lies between 0 and 1.

Reward is updated to include PDB divergence and resource utilization.

Therefore, the proposed method applies the RL based learning model at the centralized controller 140 co-ordinating across multiple cells and provides most optimal balance between resource utilization maximization and interference minimization efficiently.

Figure 5A:
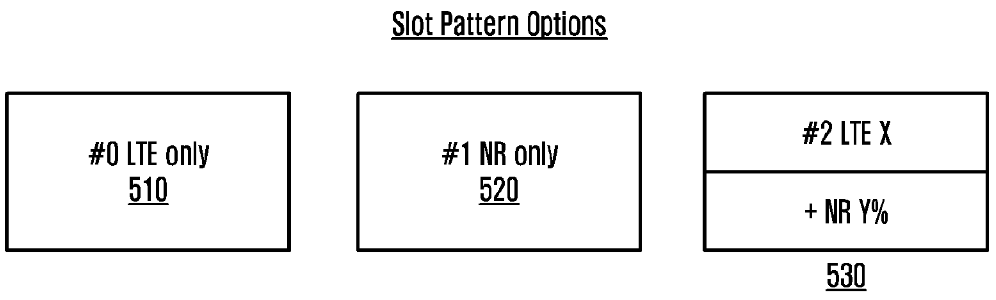
FIG. 5A illustrates different slot patterns for allocating resources according to an embodiment of the disclosure.

FIG. 5A illustrates different slot patterns for allocating resources according to an embodiment of the disclosure.

Referring to FIG. 5A, a slot pattern of a LTE system 510, a slot pattern of a NR system 520, and a slot pattern of a combination of LTE and NR system 530 are depicted. The proposed method dynamically allocates the resources across the LTE system 510, the NR system 520, or the combination of LTE and NR system 530 in response to determining the slot patterns i.e., based on the TDM mode or the FDM mode.

Figure 5B:
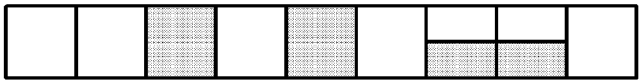
FIG. 5B illustrates a slot Pattern configuration according to an embodiment of the disclosure.

FIG. 5B illustrates a slot pattern configuration according to an embodiment of the disclosure.

In an embodiment of the disclosure, an example slot pattern configuration is depicted. The slot pattern configuration is determined for optimal resource split and for data split between the LTE system 510 and the NR system 520. Further, the slot pattern configuration is determined for optimal resource split between the control symbols and the data symbols.

Figure 5C:
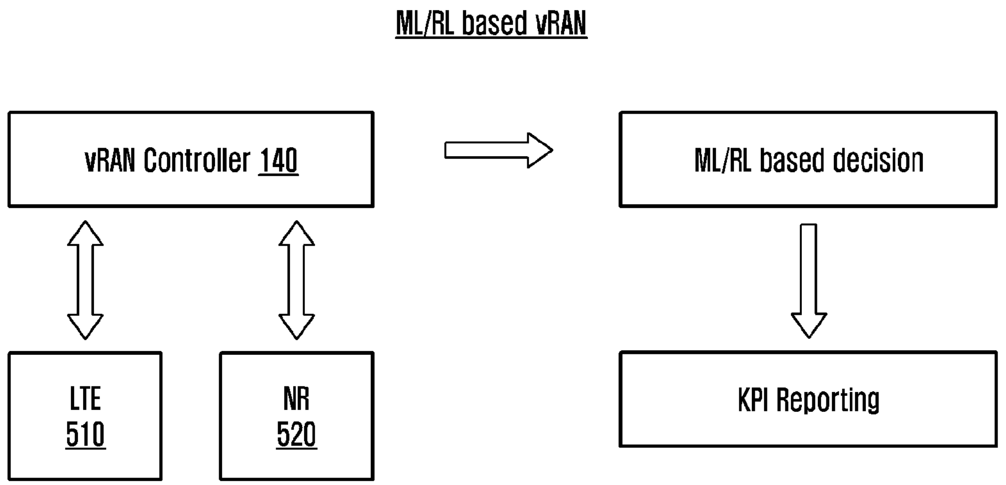
FIG. 5C illustrates a centralized controller according to an embodiment of the disclosure.

FIG. 5C illustrates a centralized controller according to an embodiment of the disclosure.

Referring to FIG. 5C, the centralized controller 140 receives the plurality of parameters from the LTE system 510 and the NR system 520. The plurality of parameters received from the LTE system 510 and the NR system 520 are pre-processed and shared with the RL model 41 for determining the resource split between the plurality of bearers of the LTE cell and the plurality of bearers of the NR cell based on the plurality of parameters. The RL model 41 performs optimal resource split based on the plurality of parameters, and determines the number of bearers across both the LTE cell and the NR cell, load distribution across both the LTE cell and the NR cell, the MCS/SINR distribution of the UEs and observed Vs. configured PDB. The RL model 41 determines and reports the optimal KPI parameters for the overlapped LTE cell and NR cell combination based the resource split and the number of bearers across both the LTE cell and the NR cell, load distribution across both the LTE cell and the NR cell, the MCS/SINR distribution of the UEs and the observed Vs. configured PDB.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network entity in a wireless network, the method comprising:

determining a plurality of dynamic spectrum sharing (DSS) parameters for sharing of resources of a same carrier between a long-term evolution (LTE) cell and a new radio (NR) cell, wherein the plurality of DSS parameters includes information on a buffer occupancy (BO), a modulation and coding scheme (MCS), and a packet delay budget (PDB);

determining an allocation of physical layer resources between the LTE cell and the NR cell based on the plurality of DSS parameters;

determining a fairness index for maintaining fairness among a plurality of bearers of the LTE cell and a plurality of bearers of the NR cell based on the determined allocation of physical layer resources, accumulated transport block sizes for the LTE cell and the NR cell, and guaranteed bit rates (GBR) for the LTE cell and the NR cell;

determining key performance indicator (KPI) parameters based on the fairness index, throughput associated with the LTE cell and the NR cell and interference associated with the LTE cell and the NR cell; and allocating physical layer resources between the LTE cell and the NR cell based on the KPI parameters.

2. The method of claim 1, wherein the plurality of DSS parameters further includes at least one of a cell identifier (ID), a radio network temporary Identifier (RNTI), a bandwidth, total number of resource blocks, a user equipment (UE) configuration, access and mobility management related parameters of a UE, a UE ID, channel model parameters, or a signal-to-noise ratio and a block error rate.

3. The method of claim 1, wherein the determining of the KPI parameters further comprises:

determining the throughput in the network entity and across neighboring cells of the LTE cell and neighboring cells of the NR cell based on the fairness index; and determining the interference across neighboring cells of the LTE cell and the neighboring cells of the NR cell based on the plurality of DSS parameters.

4. The method of claim 1, wherein the determining of the fairness index further comprises:

determining, based on the plurality of DSS parameters, a first priority metric comprising an accumulated transport block size and a GBR of each bearer of the plurality of bearers of the LTE cell, and a second priority metric comprising an accumulated transport block size and a GBR of each bearer of the plurality of bearers of the NR cell; and determining the fairness index using the first priority metric and the second priority metric.

5. The method of claim 1, wherein the allocating physical layer resources between the LTE cell and the NR cell further comprises:

determining the allocation of physical layer resources between at least one bearer of a plurality of bearers of the LTE cell and at least one bearer of a plurality of bearers of the NR cell based on a frequency-division multiplexing (FDM) mode;

determining a slot for allocating the physical layer resources to the at least one bearer of the plurality of bearers of the LTE cell and at least one physical layer resource to the at least one bearer of the plurality of bearers of the NR cell based on the FDM mode or a time-division multiplexing (TDM) mode; and allocating at least one physical layer resource to the at least one bearer of the plurality of bearers of the LTE cell and at least one physical layer resource to the at least one bearer of the plurality of bearers of the NR cell in response to determining the slot.

6. The method of claim 5, wherein in case that the slot for allocating the at least one resource to the at least one bearer of the plurality of bearers of the LTE cell and the at least one resource to the at least one bearer of the plurality of bearers of the NR cell is determined based on the FDM mode, the method further comprising:

selecting candidate bearers from the plurality of bearers of the LTE cell and the plurality of bearers of the NR cell based on a first priority metric comprising an accumulated transport block size and a GBR of each bearer of the plurality of bearers of the LTE cell and a second priority metric comprising an accumulated transport block size and a GBR of each bearer of the plurality of bearers of the NR cell;

separating the candidate bearers per cell of the LTE cell and the NR cell based on the first priority metric and the second priority metric; and allocating the at least one resource to the at least one bearer of the plurality of bearers of the LTE cell and the at least one resource to the at least one bearer of the plurality of bearers of the NR cell using the slot based on the FDM mode.

7. The method of claim 5, wherein in case that the slot for allocating the at least one resource to the at least one bearer of the plurality of bearers of the LTE cell and the at least one resource to the at least one bearer of the plurality of bearers of the NR cell is determined based on the TDM mode, the method further comprising:

determining candidate bearers per cell of the LTE cell and the NR cell based on a first priority metric comprising an accumulated transport block size and a GBR of each bearer of the plurality of bearers of the LTE cell and a second priority metric comprising an accumulated transport block size and a GBR of each bearer of the plurality of bearers of the NR cell; and allocating the at least one resource to the at least one bearer of the plurality of bearers of the LTE cell and the at least one resource to the at least one bearer of the plurality of bearers of the NR cell using the slot based on the TDM mode.

8. The method of claim 1, wherein the determining of the KPI parameters further comprises generating at least one of a delay distribution based on a packet delay for each bearer for each of the LTE cell and the NR cell, or a distribution based on a buffer occupancy and a modulation and coding scheme for each bearer for each of the LTE cell and the NR cell.

9. A network entity in a wireless network, the network entity comprising:

a communicator; and at least one processor coupled to the communicator, and configured to:

determine a plurality of dynamic spectrum sharing (DSS) parameters for sharing of resources of a same carrier between a long-term evolution (LTE) cell and a new radio (NR) cell, wherein the plurality of DSS parameters includes information on a buffer occupancy (BO), a modulation and coding scheme (MCS), and a packet delay budget (PDB), determine an allocation of physical layer resources between the LTE cell and the NR cell based on the plurality of DSS parameters, determine a fairness index for maintaining fairness among a plurality of bearers of the LTE cell and a plurality of bearers of the NR cell based on the determined allocation of physical layer resources, accumulated transport block sizes for the LTE cell and the NR cell, and guaranteed bit rates (GBR) for the LTE cell and the NR cell, determine key performance indicator (KPI) parameters based on the fairness index, throughput associated with the LTE cell and the NR cell, and interference associated with the LTE cell and the NR cell, and allocate physical layer resources between the LTE cell and the NR cell based on the KPI parameters.

10. The network entity of claim 9, wherein the plurality of DSS parameters further includes at least one of a cell identifier (ID), a radio network temporary identifier (RNTI), a bandwidth, a total number of resource blocks, a user equipment (UE) configuration, access and mobility management related parameters of a UE, a UE ID, channel model parameters, or a signal-to-noise ratio and a block error rate.

11. The network entity of claim 9, wherein the at least one processor is further configured to, in determining the KPI parameters determine the throughput in the network entity and across neighboring cells of the LTE cell and neighboring cells of the NR cell based on the fairness index, and determine the interference across neighboring cells of the LTE cell and neighboring cells of the NR cell based on the plurality of DSS parameters.

12. The network entity of claim 9, wherein the at least one processor is further configured to, in determining the fairness index:

determine, based on the plurality of DSS parameters, a first priority metric comprising an accumulated transport block size and a GBR of each bearer of the plurality of bearers of the LTE cell, and a second priority metric comprising an accumulated transport block size and a GBR of each bearer of the plurality of bearers of the NR cell, and determine the fairness index using the first priority metric and the second priority metric.

13. The network entity of claim 9, wherein the at least one processor is further configured to, in in allocating physical layer resources between the LTE cell and the NR cell:

determine the allocation of physical layer resources between at least one bearer of a plurality of bearers of the LTE cell and at least one bearer of a plurality of bearers of the NR cell based on a frequency-division multiplexing (FDM) mode, determine a slot for allocating the physical layer resources to the at least one bearer of the plurality of bearers of the LTE cell and at least one physical layer resource to the at least one bearer of the plurality of bearers of the NR cell based on the FDM mode or a TDM mode, and allocate at least one physical layer resource to the at least one bearer of the plurality of bearers of the LTE cell and at least one physical layer resource to the at least one bearer of the plurality of bearers of the NR cell in response to determining the slot.

14. The network entity of claim 13, wherein in case that the slot for allocating the at least one resource to the at least one bearer of the plurality of bearers of the LTE cell and the at least one resource to the at least one bearer of the plurality of bearers of the NR cell is determined based on the FDM mode, the at least one processor is further configured to:

select candidate bearers from the plurality of bearers of the LTE cell and the plurality of bearers of the NR cell based on a first priority metric comprising an accumulated transport block size and a GBR of each bearer of the plurality of bearers of the LTE cell and a second priority metric comprising an accumulated transport block size and a GBR of each bearer of the plurality of bearers of the NR cell, separate the candidate bearers per cell of the LTE cell and NR cell based on the first priority metric and the second priority metric, and allocate the at least one resource to the at least one bearer of the plurality of bearers of the LTE cell and the at least one resource to the at least one bearer of the plurality of bearers of the NR cell using the slot based on the FDM mode.

15. The network entity of claim 13, wherein in case that the slot for allocating the at least one resource to the at least one bearer of the plurality of bearers of the LTE cell and the at least one resource to the at least one bearer of the plurality of bearers of the NR cell is determined based on a time-division multiplexing (TDM) mode, the at least one processor is further configured to:

determine candidate bearers per cell of the LTE cell and NR cell based on a first priority metric comprising an accumulated transport block size and a GBR of each bearer of the plurality of bearers of the LTE cell and a second priority metric comprising an accumulated transport block size and a GBR of each bearer of the plurality of bearers of the NR cell, and allocate the at least one resource to the at least one bearer of the plurality of bearers of the LTE cell and the at least one resource to the at least one bearer of the plurality of bearers of the NR cell using the slot based on the TDM mode.

16. The network entity of claim 9, wherein the at least one processor is further configured to:

in determining the KPI parameters, generate at least one of a delay distribution based on a packet delay for each bearer for each of the LTE cell and the NR cell, or a distribution based on a buffer occupancy and a modulation and coding scheme for each bearer for each of the LTE cell and the NR cell.

* * * * *